Nov. 15, 1960  N. B. ROYER  2,960,628
WELDER
Filed Sept. 25, 1959
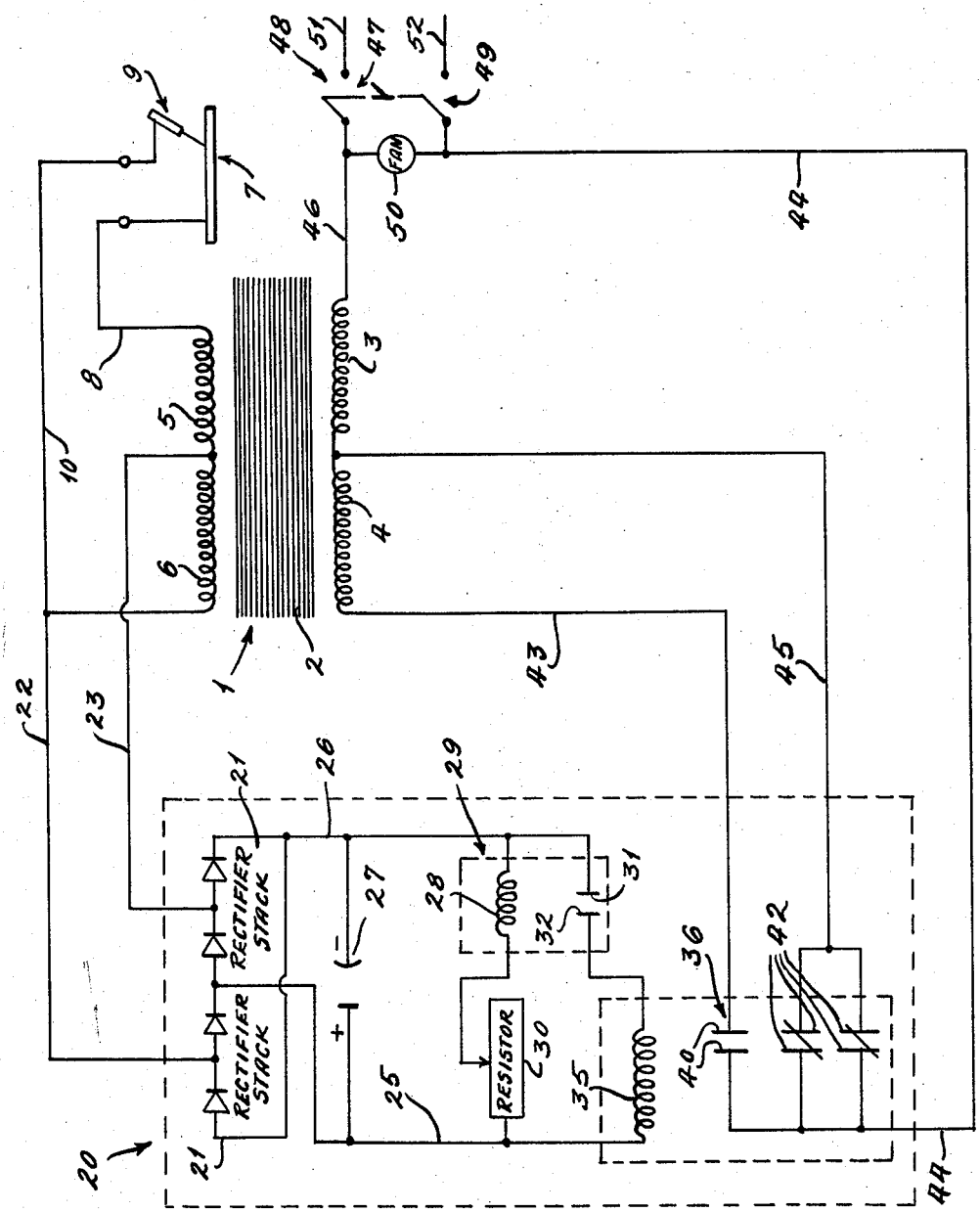
INVENTOR:
NEAL B. ROYER
By Sutherland, Potter & Taylor
ATTORNEYS.

United States Patent Office 2,960,628
Patented Nov. 15, 1960

2,960,628
WELDER

Neal B. Royer, Des Peres, Mo., assignor to The Emerson Electric Manufacturing Company, St. Louis, Mo., a corporation of Missouri Filed Sept. 25, 1959, Ser. No. 842,281

3 Claims. (Cl. 315—279)

This invention relates to alternating current arc welders. Conventional arc welders have a relatively high open circuit voltage, for example, 80 volts. The term "open circuit voltage" is used herein to indicate the voltage between the welding connections, i.e. the connections to the welding electrode and work piece respectively, when the welder is connected to a source of power, but no welding is taking place.

In conventional arc welders with normal or high flux densities in the transformer core, the welder does not cool as efficiently as it might because of the heat caused by core losses.

One of the objects of this invention is to provide a welder with a relatively low open circuit voltage as compared with conventional arc welders.

Another object of this invention is to provide a welder in which the heating of the transformer during open circuit operation of the welder is substantially less than that of conventional arc welders, so that it can be run at a higher duty cycle.

Still another object of this invention is to provide such an improved welder which is economical of construction, rugged, dependable, and safe.

Other objects will become apparent to those skilled in the art in the light of the following description and accompanying drawing.

In accordance with this invention, generally stated, an A.C. arc welder is provided with an auxiliary primary coil in its transformer, and means are provided for inserting the auxiliary primary coil into the circuit during open circuit operation of the welder to lower the open circuit voltage, and for automatically removing the auxiliary primary coil from the circuit during welding operation of the welder.

Preferably, means are also provided for delaying the re-insertion of the auxiliary primary coil into the circuit, after it has been removed in response to the striking of an arc, when the welder returns to open circuit condition.

In the drawing, the figure is a somewhat simplified circuit diagram illustrating the electrical circuit of one illustrative embodiment of the welder of this invention.

Referring now to the drawing, reference numeral 1 indicates the transformer section of a welder circuit. The transformer section 1 includes a core 2, a primary coil 3, an auxiliary primary coil 4, a first secondary coil 5, and a second, loosely connected, secondary coil 6. In this embodiment, the first secondary coil 5 and second secondary coil 6 comprise the secondary side of the transformer circuit. A work piece 7, electrically connected to the first secondary coil 5 by a conductor 8, and an electrode 9, electrically connected to the second secondary coil 6 by a conductor 10, constitute the welding connections to the secondary side of the transformer.

Reference numeral 20 indicates the auxiliary primary coil switching circuit. In this embodiment, the auxiliary primary coil switching circuit includes a pair of rectifier stacks 21, one of which is electrically connected to one end of the second secondary coil 6, by a conductor 22, and the other of which is electrically connected to the other end of the second secondary coil 6 by means of a conductor 23. A conductor 25 is connected to the positive side of the rectifier stacks 21, and a conductor 26 is connected to the negative side of the rectifier stacks 21. A capacitor 27 is connected between the conductors 25 and 26. A time delay relay coil 28, of a time delay relay 29, is electrically connected, through a variable resistor 30, to the conductor 25 and the conductor 26. The time delay relay coil 28 controls time delay relay contacts 31 and 32. The time delay relay contact 31 is connected electrically to the conductor 26. The time delay relay contact 32 is connected electrically to one end of a relay coil 35 of a relay 36. The other end of relay coil 35 is connected to the conductor 25. The relay coil 35 of the relay 36 operates auxiliary primary coil contacts 40, and primary coil contacts 42.

The time delay relay contacts 31 and 32 are normally biased to open position. The auxiliary primary coil contacts 40 of the relay 36 are also normally biased to open position. The contacts 42 of the relay 36, are normally biased to closed position.

One of the auxiliary primary contacts 40 is electrically connected to one end of the auxiliary primary coil. The other of the auxiliary primary coil contacts 40 is electrically connected to a power lead 44. The contacts 42 are electrically connected on one side to the lead 44, and on the other side, through a conductor 45, to the junction of the auxiliary primary coil and the primary coil, which, in the embodiment shown, are connected in series. At its end opposite the connection with the conductor 45, the primary coil is electrically connected, by means of a conductor 46, to one pole 47 of a two pole power switch 48. The other pole 49 of the switch 48 is electrically connected to the power lead 44.

A cooling fan 50 is electrically connected to the power lead 44 and the conductor 46.

Power lines 51 and 52 are electrically connected to the poles 47 and 49 respectively when switch 48 is manually closed.

As has been indicated heretofore, the circuit diagram of the figure is somewhat simplified. For example, in the commercial welder, a number of loosely connected secondary coils may be provided or a separate reactor may be provided, and various taps, so that different amperages may be obtained by connecting the electrode and work piece to various different taps. However, since these arrangements form no part of this invention, they have been omitted.

In operation, assuming that the switch 48 is open, the time delay relay contacts 31 and 32 and the auxiliary primary coil contacts 40 will be separated, and the contacts 42 will be closed. If now, the switch 48 is closed manually, current will flow through the power lines 51 and 52, from a source of A.C. current not here shown, through the power lead 44, contacts 42, conductor 45, primary coil 3 and conductor 46, energizing the primary coil 3 and magnetically exciting the transformer core 2 and inducing voltage in the first secondary coil 5 and loosely coupled secondary coil 6. The voltage induced in the second secondary coil 6 is sufficiently high so that the rectified current from the rectifier stacks 21 initiates the action of the time delay relay 29.

After a predetermined length of time, the time delay relay 29 acts to close the contacts 31 and 32, energizing the coil 35 of the relay 36, causing the contacts 40 to close and the contacts 42 to open. The capacitor 27 provides sufficient energy storage during the switching time of the relay 36, to permit the completion of the circuit switchover. This establishes a new circuit from the power lead 44 through the conductor 43 to the auxiliary primary coil 4. The current from the power lead 44 now passes through both the auxiliary primary 4 and the primary coil 3, thence to the conductor 46. Since the auxiliary primary coil 4 and the primary coil 3 are in series, the effect of this new circuit is to increase the number of turns of the primary, decreasing the voltage induced in the secondary. The induced voltage in the secondary, however, is sufficient to hold the contacts 31 and 32 of the time delay relay 29 and contacts 40 of the relay 36, in closed position, and contacts 42 in open position.

When an arc is struck between the electrode 9 and the work piece 7, the voltage across the second secondary 6, hence to the rectifier stacks 21, drops below the critical holding voltage of the time delay relay coil 28, causing the contacts 31 and 32 to separate. The separation of the contacts 31 and 32 breaks the circuit to the coil 35 of the relay 36, and the contacts 40 separate while the contacts 42 close. The primary coil 3 is now energized, and the auxiliary primary coil 4 de-energized, as they were when the switch 48 was initially closed. The holding or drop out voltage is set by means of the variable resistor 30.

If the welding arc is not established as a result of the first stroke, the secondary voltage rises relatively high, as it did initially. This elevated voltage is sufficient to initiate the action of the time delay relay. However, since there is a substantial time delay before the time delay contacts 31 and 32 are closed by the time delay relay 29, the operator has an opportunity to make several more attempts to start the arc with the relatively high open circuit voltage, before the voltage is again reduced by the insertion in the circuit of the auxiliary primary coil 4 by the operation of the time delay relay 29.

When a stable arc is established, and welding is in process, the voltage across the second secondary 6, from which the conductors 22 and 23 to the rectifier stacks 21 lead, is reduced below the initiating voltage required by the time delay relay 29.

Simply by way of example, and not by way of limitation, since the absolute values of the voltage, resistance, amperage, and time, and the characteristics of the transformer and reactor, are functions of the design of the welder and the operational characteristics desired, the following specific figures are given. The power supplied can be at 460 volts, 60 cycle, single phase A.C. The primary coil 3 may be wound with 270 turns, and the auxiliary primary coil 4, with 365 turns. The resistance of the primary coil 3 may be .3 ohm, that of the auxiliary primary coil 4, 3.3 ohms. The current at the welding connection between work piece 3 and the electrode 9 can be 205 amperes. The induced voltage from the primary coil 3 in open circuit operation can be 80 volts, sufficient to initiate the time delay relay 29. The induced voltage in the secondary circuit when the auxiliary primary coil 4 is energized in series with the primary coil 3 is approximately 35 volts, sufficient to hold the contacts 31 and 32 and the contacts 40 in closed position and the contacts 42 in open position. When an arc is struck between the welding connection of work piece 7 and electrode 9, the voltage across the second secondary 6 may drop to about 15 volts, which is below the dropout or holding voltage of the time delay relay 29. As has been indicated heretofore, the value of the dropout voltage is determined by the variable resistor 30. The secondary circuit voltage during the welding operation may be of the order of 20 to 30 volts, which is insufficient to initiate the time delay relay. In the illustrative figures given, it can be seen that if an arc is not established on the first attempt, so that the auxiliary primary is de-energized, but the welder is in open circuit condition, the voltage in the secondary circuit will rise to about 80 volts, and stay there for two or more seconds (the predetermined delay period of the time delay relay), during which time the operator can attempt to strike the arc at the higher voltage.

The advantages, in safety, of this invention, are obvious. Within a few seconds after the welder is turned on, the voltage across the welding electrode 7 and work piece 9 has dropped to a lower voltage. The higher duty cycle of the welder of this invention is made possible by the fact that when the auxiliary primary coil 6 is inserted in the transformer circuit, the saturation in the core of the transformer is greatly reduced, which results in a lower current flow and wattage consumption, and less heating during the open circuit operation of the welder.

Numerous variations in the construction of the welder of this invention, within the scope of the appended claims, will be apparent to those skilled in the art in the light of the foregoing disclosure.

Thus it can be seen that a welder is provided which is safe, efficient and yet uncomplicated.

Having thus described the invention, what is claimed and desired to be secured by Letters Patent is:

1. In an A.C. welder having a transformer with primary and secondary coils, and welding connections to said secondary coil, the improvement comprising an auxiliary primary coil in said transformer, said auxiliary primary coil being connected to the primary coil circuit through relay-controlled contacts which are normally biased to circuit-breaking position, a contact-controlling relay electrically connected to the secondary coil, to be initially operated in response to a voltage produced by the said primary coil during open circuit operation of said welder, to move said contacts into circuit making position to energize said auxiliary primary coil, the energizing of said auxiliary primary coil reducing the voltage in the secondary coil, and means, responsive to the striking of an arc across said welding connections for lowering the voltage to said relay sufficiently to cause said relay to release said contacts to their normal circuit breaking position, to de-energize the said auxiliary primary coil.

2. In an A.C. welder having a transformer with primary and secondary coils, and welding connections to said secondary coil, the improvement comprising an auxiliary primary coil in said transformer, normally in out-of-circuit relation with the primary coil, a time delay relay connected to the secondary coil side of said transformer and initially responsive to a relatively high voltage produced by energizing said primary coil in open circuit condition of the welder, said relay acting, after a predetermined, substantial length of time after its initial energizing, to energize the auxiliary primary coil, the energizing of said auxiliary primary coil reducing the voltage in said secondary coil to an amount still sufficient to hold said relay in its auxiliary primary coil energizing condition, means, responsive to the striking of an arc across said welding connections for lowering the voltage to said relay sufficiently to cause said relay to de-energize said auxiliary primary coil, the voltage to said relay during the welding operation being insufficient to initiate the action of said relay.

3. In an A.C. welder having a transformer with primary and secondary coils, and welding connections to said secondary coil, the improvement comprising an auxiliary primary coil in said transformer, energized during open circuit operation of said welder to reduce the voltage in the secondary coil, means, responsive to the striking of an arc across said welding connections, for de-energizing said auxiliary primary coil, and means, operating after a predetermined, substantial, interval of time, for re-energizing said auxiliary coil upon return of said welder to open circuit condition.

References Cited in the file of this patent
UNITED STATES PATENTS
2,502,646   Girard _____ Apr. 4, 1950.